Oct. 3, 1950     W. V. THELANDER     2,524,146
FRICTION CLUTCH PLATE
Filed March 11, 1949

Inventor:
W. Vincent Thelander

Patented Oct. 3, 1950

2,524,146

UNITED STATES PATENT OFFICE 2,524,146

FRICTION CLUTCH PLATE

W. Vincent Thelander, Auburn, Ind., assignor to Dana Corporation, Toledo, Ohio, a corporation of Virginia Application March 11, 1949, Serial No. 80,855

14 Claims. (Cl. 192—107)

This invention relates to improvements in friction clutch plates, and is more particularly concerned with the so-called "mush" construction used in cushion type clutch plates, namely, the peripheral cushion portion of the plates on which the friction facing material is carried with freedom for the opposed facings to yield under a predetermined resistance for smoother clutch engagement and freedom from grabbing and chattering.

Engineers concerned with the design and construction of cushion type clutch plates have always in the testing of such clutch plates for performance taken special note of the build-up or packing rate of the plates, and are generally in agreement that an ideal mush construction is one in which the build-up rate is substantially uniform, because of the smoothness of power take-up and comparative freedom from slippage going with it. It is, therefore, one of the principal objects of my invention to provide a cushion type clutch plate so designed and constructed as to meet that requirement as closely as possible.

The clutch plates of my invention are further improved by making the entire cushion segments, with the exception only of the shims or spacers carried on the outer end portions under the facings, of spring material, with a view to the cushioning portion of the plate having the desired spring-back in the cushioning action and to avoid its taking a set as a result of an overheating, if that should ever occur. Incidental to the overlapping of adjoining edge portions of the cushioning segments, I prefer to crimp the segments transversely near their inner attaching end portions, the segments of one set being crimped in one direction and those of the other set being crimped in the opposite direction, so that the overlapped edge portions are pressed tightly together in coplanar relationship, thereby insuring a true-running plate of uniform thickness throughout the cushioning portion. Furthermore, with this all-spring-steel construction and by virtue of my novel design, I may reduce the spring cushion pressure, if desired, by reversing the relationship of the shim and associated cushion segment in the alternate segments that are fastened to one of said facings, without otherwise altering the design described above, whereby the spring deflection upon engagement of the clutch is reduced to what the comparatively small thickness of the cushion segments alone causes.

The invention is illustrated in the accompanying drawing, in which—

Similar reference numerals are applied to corresponding parts throughout the views.

Figure 1:
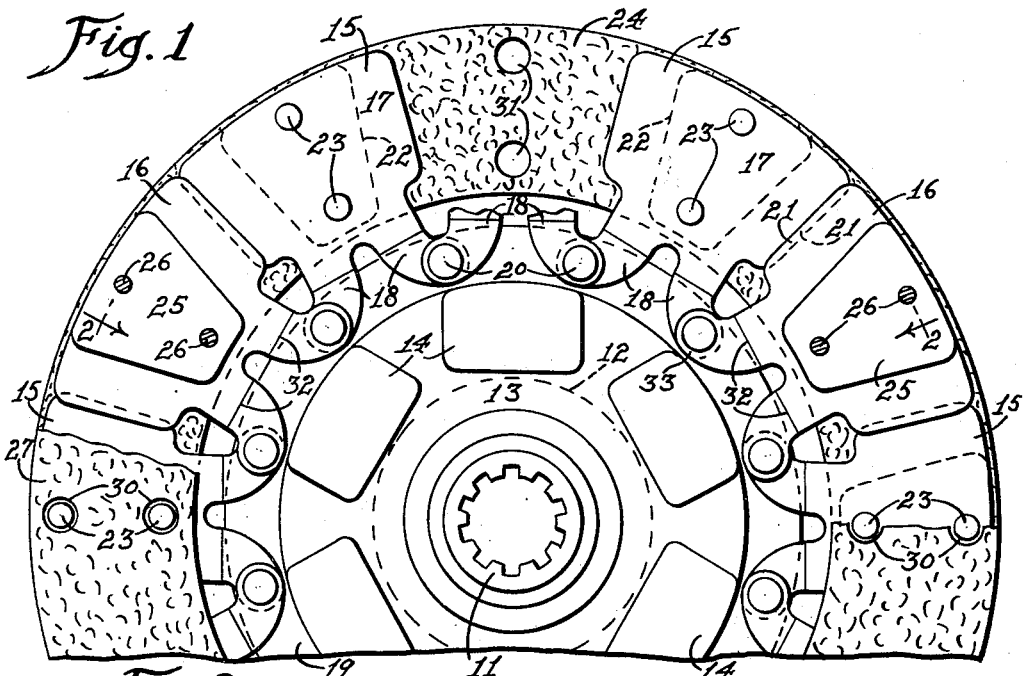
Fig. 1 is a rear view of a clutch plate made in accordance with my invention, the lower portion of the plate being broken away to conserve space, and a portion of one friction facing ring being removed to better illustrate the mush construction, the latter being viewed on the line 1—1 of Fig. 2.
Figure 2:
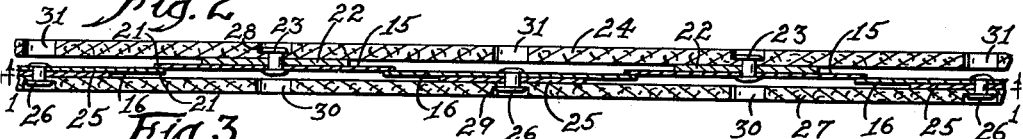
Fig. 2 is a section on the arcuate line 2—2 of Fig. 1.

Referring first to Figs. 1 to 4, the clutch plate shown comprises relatively rotatable inner and outer portions, the inner portion being formed by a center hub 11 splined for driving connection with the driving shaft of an automotive transmission and provided with an annular flange 12 onto which a notched plate is riveted for oscillatory movement with the hub relative to the housing plates 13, in which pockets 14 are formed containing spring cushioning assemblies, so that when the relative movement occurs between the hub 11 and housing plates 13, the springs of said assemblies are compressed lengthwise to cushion the drive and absorb vibrations, as well known in this art.

The outer portion of the plate contains the mush construction with which my invention is particularly concerned. There are two series of stamped spring steel cushion segments 15 and 16, the segments of both series being circumferentially spaced, and the segments 15 of one series being in staggered relation to the segments 16 of the other series. The segments 15 and 16 are of identical form and, therefore, interchangeable. Each segment comprises a generally rectangular main body portion 17 elongated circumferentially of the plate, and having a pair of circumferentially spaced legs 18 extending inwardly therefrom for attachment of the segment to the radially outer rim portion 19 of the housing plates 13 by rivets 20 entered through registering holes in the overlapping end portions of the legs 18 on neighboring segments 15—16. The segments 15 and 16 are, therefore, mounted in parallel planes with their edge portions 21 in overlapping relation, as clearly appears in Figs. 1 and 2. Segmental-shaped, stamped, sheet metal shims or spacers 22 are riveted to the outer faces of the main body portions 17 of the segments 15 on their radial center lines, as shown at 23, the rivets 23 being entered through registering holes in the segments 15 and shims 22 and through registering holes in the friction facing ring or pad 24 that engages the outer faces of the shims 22, as clearly appears in Fig. 2. In like manner, similarly shaped shims 25 are riveted, as at 26, to the outer faces of the segments 16, and these rivets serve also to secure the other friction facing ring or pad 27 to the segments 16, as clearly appears in Fig. 2. The heads of the rivets 23 fit in countersunk holes 28 provided therefor in the facing 24, and the same is true of the heads of the rivets 26, for which there are countersunk holes 29 in the facing 27. Holes 30 are provided in the facing 27 in register with the heads on the other ends of the rivets 23, and holes 31 are provided in the facing 24 in register with the heads on the other ends of the rivets 26, so that the rivets will not interfere with close compacting of the outer cushioning portion of the plate when the clutch is engaged. The riveting at 20 of the inner ends of the legs 18 I found gave rise to a tendency for the body portions 17 of the segments 15 and 16 to stand in divergent relationship to some extent, and it is with a view to avoiding that tendency that I have provided a crimp 32 intermediate the ends of the legs 18 transversely thereof, so as to make the attaching feet portions 33 lie in a plane in acute angle relationship to the plane of the main body portion 17, the crimping on the one set 15 being in one direction and the crimping on the other set 16 being in the opposite direction, so that the overlapped edge portions 21 are pressed tightly together in coplanar relationship, insuring a true-running plate of uniform thickness throughout the cushioning portion.

Figure 3:
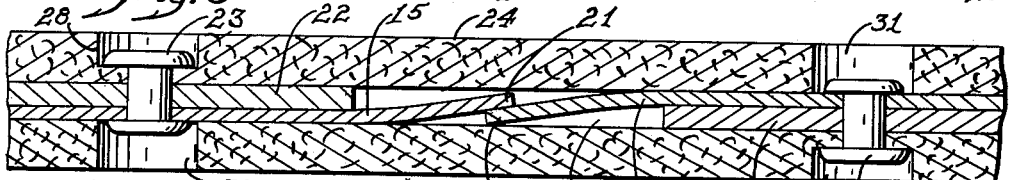
Fig. 3 is an enlargement of a portion of Fig. 2, illustrating the spring cushioning action by showing the facings pressed together as in the engaged condition of the clutch.

In operation, it should be clear that when the pressure plate is moved toward the flywheel in the engagement of the clutch, the facings 24 and 27 are pressed together, as illustrated in Fig. 3, thereby flexing the segments 15 and 16 in the spaces 34 between the shims 22 and 25. The build-up rate is substantially uniform in the packing together of the parts in the engagement of the clutch, due to the fact that the segments 15 and 16 constitute separate leaf springs adapted to be flexed by one another and overlap to such a small extent at their edge portions 21 that there can be only a simple flexing or springboard action of the edge portion of each segment. As a result, there is greater smoothness of power take-up and comparative freedom from slippage with this mush construction. The thickness of the shims or spacers 22 and 25, as clearly appears in Fig. 3, determines the extent to which the overlapped portions of the segments 15 and 16 will be flexed, and, if desired, these shims or spacers 22 and 25 may be increased in thickness or decreased in thickness to increase or decrease the ultimate cushioning pressure. The fact that the entire cushion segments 15 and 16 are of spring material insures good spring-back throughout the circumference of the cushioning portion of the plate every time the clutch is disengaged, and avoids likelihood of the plate taking a set as a result of an overheating, if that should occur. The segments 15 and 16, being flat, can be produced at low cost in quantity production to the desired uniformity so far as spring characteristics are concerned, and that, of course, makes for uniform thickness of the cushioning portion and uniform wear on the facings. The interchangeability of the segments 15 and 16 is of advantage not only in reduced die costs but also speedier assembling.

Figure 5:
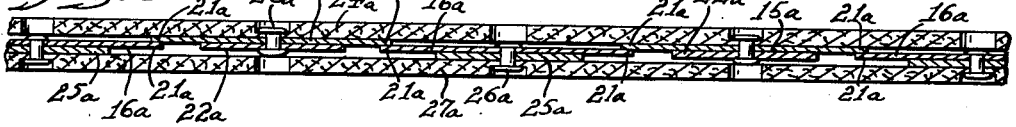
Fig. 5 is a section similar to Fig. 2, showing a different arrangement of the shims relative to the one set of spring steel segments to obtain a reduced cushioning action.
Figure 4:
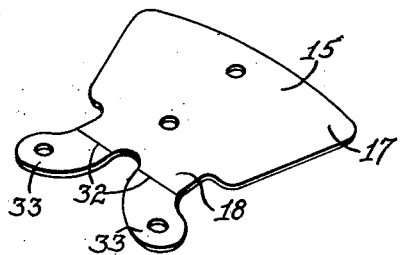
Fig. 4 is a perspective view of one of the spring steel cushion segments appearing in Figs. 1 to 3.

If the outer or cushioning portion of the clutch plate is built up, as shown in Fig. 5, a reduced amount of cushioning pressure is obtained, because the deflection of the overlapping edge portions of the segments 15a and 16a is determined by the comparatively small thickness of the cushion segments alone. This is due to the fact that only the segments 16a are flexed when the clutch is engaged, the segments 15a having their outer faces in direct contact with the facing 24a, the shims or spacers 22a for these segments being riveted to the inner faces of segments 15a instead of to the outer faces. The shims or spacers 25a for segments 16a are riveted to the outer faces thereof with the facing ring 27a, similarly as in the construction of Figs. 1 to 4. The operation with this construction is otherwise the same as with that of Figs. 1 to 4. It is, of course, understood that the segments 15a and 16a being disposed in parallel planes are riveted by leg portions 18 to the outer rim portion 19 of the housing plates 13 by rivets 20 entered through registering holes in the overlapping attaching feet portions 33, the same as in Figs. 1 to 4. It is also understood that the segments 15a and 16a are crimped transversely intermediate the ends of the leg portions 19, as shown at 32 in Fig. 4, for the same reason described above in connection with segments 15 and 16, the crimping of segments 15a being in the reverse direction from the crimping of segments 16a so that the overlapping edge portions 21a will be pressed tightly together in coplanar relationship, thereby insuring a true-running plate of uniform thickness throughout the cushioning portion.

It is believed the foregoing description conveys a good understanding of the objects and advantages of my invention. The appended claims have been drawn to cover all legitimate modifications and adaptations.

I claim:

1. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, spacer plates mounted on the outer side of both series of cushion plate sections leaving more than the overlapping edge portions thereof uncovered and free to be flexed for the cushion action, and rings of friction facing material mounted on the outer sides of the two series of cushion plate sections and spaced therefrom by said spacer plates.

2. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, spacer plates mounted on the outer side of the cushion plate sections of one series, leaving more than the overlapping edge portions thereof uncovered and free to be flexed for the cushion action, a ring of friction facing material mounted on the outer side of the last named series of cushion plate sections and spaced therefrom by said spacer plates, other spacer plates mounted on the inner side of the cushion plate sections of the other series and arranged in the compacting of the cushion plate sections to abut the inner face of said ring of friction facing material to space the same therefrom and limit the compacting movement, and a second ring of friction facing material mounted on the outer side of the last named other series of cushion plate sections.

3. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, rings of friction facing material mounted on the outer sides of the two series of cushion plate sections in substantially parallel relationship thereto, and means in circumferentially spaced relation to each pair of overlapping edge portions spacing the cushion plate sections of at least one series inwardly from the ring of friction facing material mounted thereon.

4. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, pads of friction facing material mounted on the outer sides of the two series of cushion plate sections, and means in circumferentially spaced relation to each pair of overlapping edge portions for spacing said pads outwardly from said cushion plate sections to predetermine the ultimate extent of flexure of the overlapping edge portions of said cushion plate sections and accordingly predetermine the extent of cushioning action obtainable.

5. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, pads of friction facing material mounted on the outer sides of the two series of cushion plate sections, and means in circumferentially spaced relation to the overlapping edge portions for spacing the friction material outwardly from the cushion plate sections of one series only to predetermine the ultimate extent of flexure of the edge portions and accordingly predetermine the extent of cushioning action obtainable.

6. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, pads of friction facing material mounted on the outer sides of the two series of cushion plate sections, means in circumferentially spaced relation to the overlapping edge portions for spacing the friction material outwardly from the cushion plate sections of one series only to predetermine the ultimate extent of flexure of the edge portions and accordingly predetermine the extent of cushioning action obtainable, and means between the inner sides of the cushion plate sections of the other series and the friction material to limit the compacting movement.

7. A friction clutch plate as set forth in claim 1 wherein the width of overlap of the edge portions of the cushion plate sections measured circumferentially of the rings of friction facing material is small in relation to the circumferential distance between the spacer plates so that only simple or springboard-like flexure of said overlapping edge portions can occur in the compacting of the cushion plate sections.

8. A friction clutch plate as set forth in claim 2 wherein the width of overlap of the edge portions of the cushion plate sections measured circumferentially of the rings of friction facing material is small in relation to the circumferential distance between the spacer plates so that only simple or springboard-like flexure of the edge portions of the one series of cushion plate sections can occur in the compacting of the cushion plate sections.

9. A friction clutch plate as set forth in claim 3 wherein the width of overlap of the edge portions of the cushion plate sections measured circumferentially of the rings of friction facing material is small in relation to the circumferential distance between the spacing means so that only simple or springboard-like flexure of said overlapping edge portions can occur in the compacting of the cushion plate sections.

10. A friction clutch plate as set forth in claim 4 wherein the width of overlap of the edge portions of the cushion plate sections measured circumferentially of the rings of friction facing material is small in relation to the circumferential distance between the spacing means so that only simple or springboard-like flexure of said overlapping edge portions can occur in the compacting of the cushion plate sections.

11. A friction clutch plate as set forth in claim 4, wherein neighboring cushion plate sections of the two series have lateral edge portions on their radially inner ends secured to the hub in overlapping relationship, the cushion plate sections of one series being crimped transversely of their radially inner end portions so as to bias the radially outer end portions thereof toward close contact at their lateral edges with the radially outer end portions of the cushion plate sections of the other series.

12. A friction clutch plate as set forth in claim 4 wherein neighboring cushion plate sections of the two series have lateral edge portions on their radially inner ends secured to the hub in overlapping relationship, the cushion plate sections of both series being crimped transversely of their radially inner end portions so as to bias their radially outer end portions in opposite directions toward one another for close contact of their lateral edge portions.

13. A friction clutch plate comprising a central mounting means, a pair of axially spaced annular friction facings disposed radially outward from the periphery of said mounting means, means for connecting one of said friction facings in torque transmitting relation to said mounting means and including a series of circumferentially spaced, individual spring sheet metal friction-facing supports carried by said mounting means and extending in a generally radial direction and of equal radial length and attached to one friction facing only, each of said supports having a normally flat circumferentially extending outer end portion disposed between said facings and secured intermediate the ends thereof to its associated facing, which outer end portion has integral flexible end regions normally spaced from the two facings, other friction facing supports carried by said mounting means and extending in a generally radial direction and of the same radial length as the first mentioned supports but attached only to the other friction facing and disposed in circumferentially spaced relation so as to be located between the first mentioned supports, said other friction facing supports also having normally flat circumferentially extending outer end portions disposed between said facings and each secured intermediate the ends thereof to the associated facing, which outer end portions have integral flexible end regions disposed in overlapping relation to the flexible end regions of the first-mentioned friction facing supports and normally spaced from the two facings mutually to effect flexing of the end regions yieldingly to resist axial movement of one friction facing toward the other under clutch packing pressure, and means in circumferentially spaced relation to each pair of overlapping edge portions spacing the cushion plate sections of each series inwardly from the ring of friction facing material mounted thereon.

14. A friction clutch plate set forth in claim 13, wherein the friction facing supports of one set are crimped transversely of their radially inner end portions to bias the radially outer end portions toward the radially outer end portions of the other set of friction facing supports.

W. VINCENT THELANDER.

REFERENCES CITED

The following references are of record in the file of this patent:

UNITED STATES PATENTS

| Number | Name | Date |
| --- | --- | --- |
| 2,256,698 | Wolfram | Sept. 23, 1941 |
| 2,337,135 | Thelander | Dec. 21, 1943 |
| 2,339,430 | Saks | Jan. 18, 1944 |

FOREIGN PATENTS

| Number | Country | Date |
| --- | --- | --- |
| 38,165 | Norway | Oct. 29, 1923 |
| 564,578 | France | Jan. 5, 1924 |
| 866,176 | Great Britain | June 27, 1941 |